US012626719B2

(12) United States Patent
  Hayasaka

(10) Patent No.: US 12,626,719 B2
(45) Date of Patent: May 12, 2026

(54) DISK DEVICE WITH STOPPER FOR ACTUATOR ASSEMBLY

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Kenji Hayasaka, Shinagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 18/771,373

(22) Filed: Jul. 12, 2024

(65) Prior Publication Data

US 2025/0336414 A1     Oct. 30, 2025

(30) Foreign Application Priority Data

Apr. 26, 2024     (JP) ................................. 2024-072308

(51) Int. Cl.
  *G11B 21/22*       (2006.01)
  *G11B 5/48*        (2006.01)
(52) U.S. Cl.
  CPC .......... *G11B 5/4813* (2013.01); *G11B 5/4833* (2013.01); *G11B 21/22* (2013.01)
(58) Field of Classification Search
  None
  See application file for complete search history.

(56) References Cited

U.S. PATENT DOCUMENTS

| | | | | |
|---|---|---|---|---|
| 5,745,325 A * | 4/1998 | Matsumoto | .......... | G11B 5/4813 |
| 6,125,017 A | 9/2000 | Misso et al. | | |
| 7,061,723 B2 | 6/2006 | Price | | |
| 2002/0093770 A1* | 7/2002 | Wood | ........................ | G11B 5/54 |
| 2003/0090841 A1 | 5/2003 | Muraki et al. | | |
| 2004/0212931 A1* | 10/2004 | Takami | .................. | G11B 21/22 |
| 2010/0134927 A1* | 6/2010 | Minami | .................. | G11B 5/54 |
| 2021/0257002 A1* | 8/2021 | Yamane | .............. | G11B 5/5582 |
| 2025/0292791 A1* | 9/2025 | Minami | .................. | G11B 5/82 |

FOREIGN PATENT DOCUMENTS

| | | |
|---|---|---|
| JP | S62-124661 U | 8/1987 |
| JP | 2003-151226 A | 5/2003 |

* cited by examiner

*Primary Examiner* — William J Klimowicz
(74) *Attorney, Agent, or Firm* — Knobbe, Martens, Olson & Bear, LLP

(57)       ABSTRACT

According to one embodiment, a disk device includes a disk-shaped recording medium, an actuator assembly, a magnetic head supported in the actuator assembly, a first stopper which is provided contactably with the actuator assembly and defines a move of the actuator assembly in a first direction, and a first auxiliary stopper which is provided at a position where the actuator assembly comes into contact with the first auxiliary stopper after the actuator assembly comes into contact with the first stopper, and which defines the move of the actuator assembly in the first direction.

14 Claims, 14 Drawing Sheets

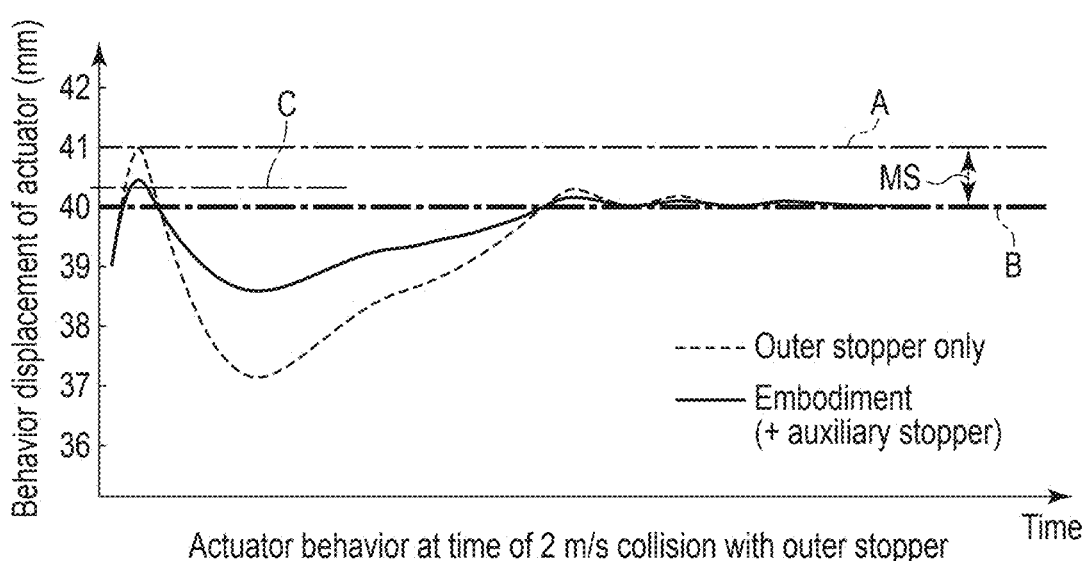
Actuator behavior at time of 2 m/s collision with outer stopper
F I G. 15
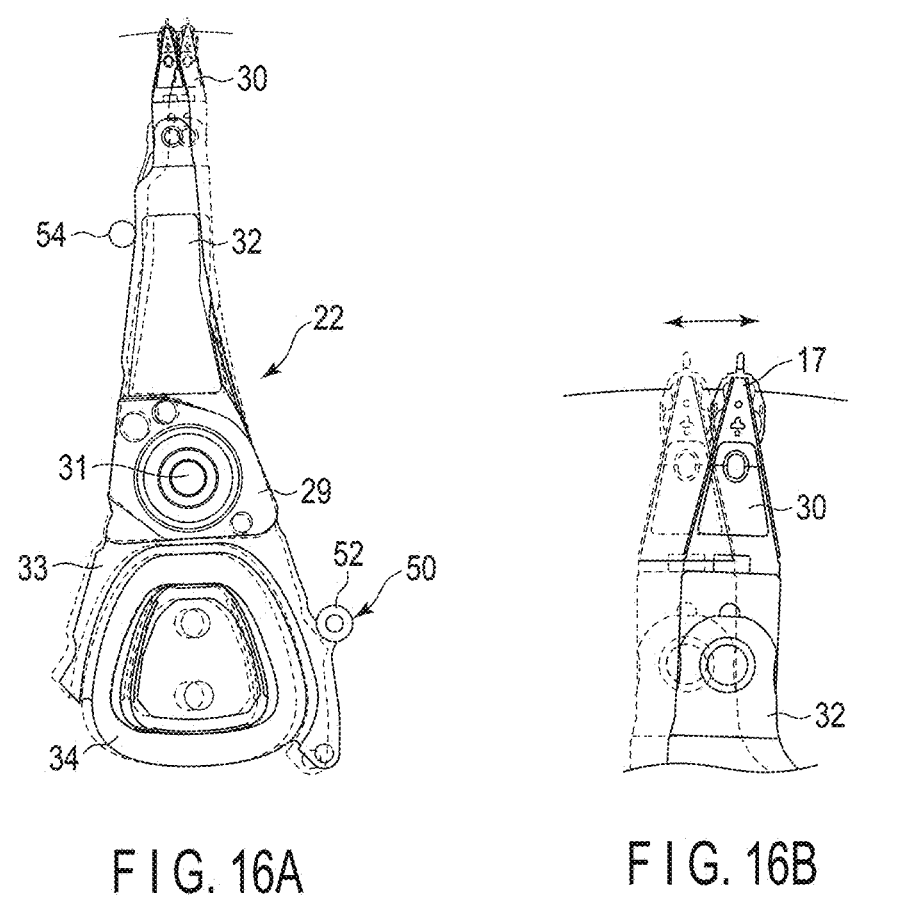
F I G. 16A               F I G. 16B

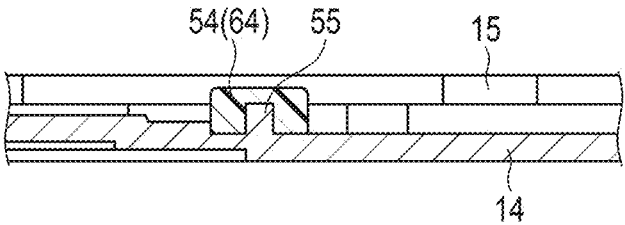
F I G. 19
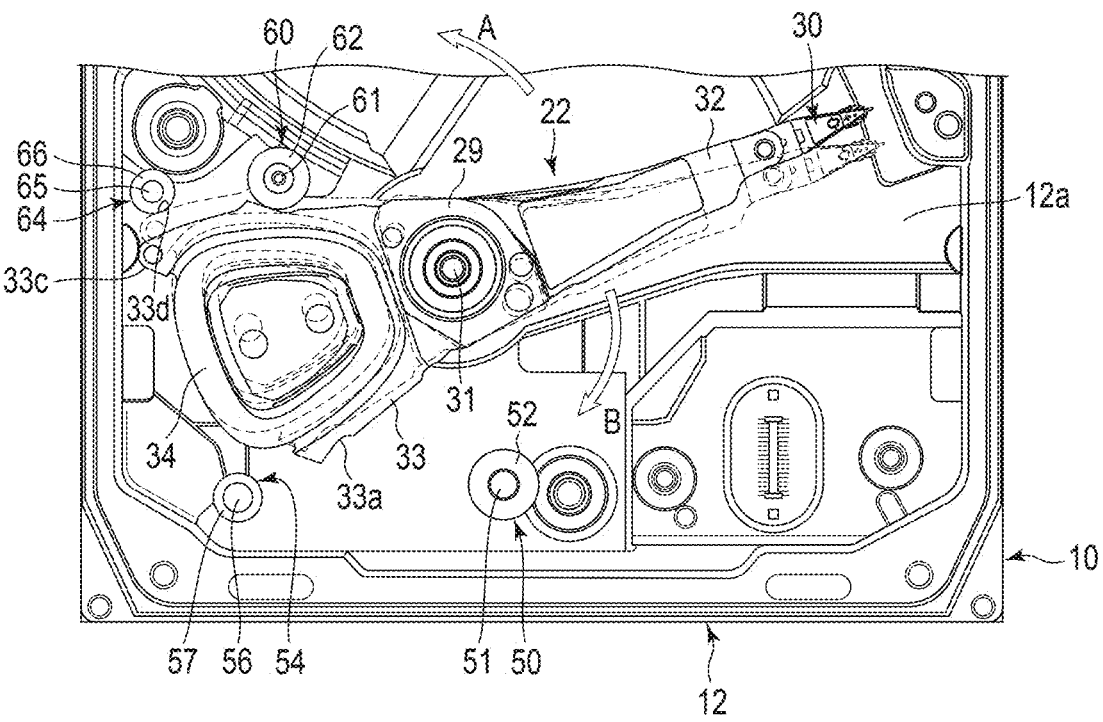
F I G. 20

DISK DEVICE WITH STOPPER FOR ACTUATOR ASSEMBLY

CROSS-REFERENCE TO RELATED APPLICATIONS

This application is based upon and claims the benefit of priority from Japanese Patent Application No. 2024-072308, filed Apr. 26, 2024, the entire contents of which are incorporated herein by reference.

FIELD

Embodiments described herein relate generally to a disk device.

BACKGROUND

As a disk device, for example, a hard disk drive (HDD) comprises a rotatable magnetic disk provided in a housing, and a pivotable actuator assembly (head suspension assembly [HSA]) which supports a magnetic head. In the housing, inner and outer stoppers which restrict the moving range of the actuator assembly are provided. Regarding the actuator assembly, its move is stopped when it collides with the stoppers, and thus, the move is restricted to a predetermined moving range. This configuration prevents the collision between the magnetic head and the other components and the deviation of the magnetic head from a ramp. To reduce the shock applied at the time of the collision of the actuator assembly, each stopper comprises a buffer member which can elastically deform.

When the actuator assembly collides with the above stoppers, the stoppers elastically deform. The amount of displacement (the mount of deformation) changes based on the materials of the stoppers, the contact positions and the collision speeds. Therefore, the contact margin between the actuator assembly and the other components such as a magnetic circuit and a recording medium needs to be sufficiently assured based on the maximum amount of displacement. An increase in the contact margin leads to the reduction in the data area of the recording medium and the design constraint of the other components. In addition, the buffer members of the stoppers may become the generation source of outgassed components and cause the contamination of the magnetic head and the magnetic disk. These problems detrimentally affect the reliability and life of the magnetic disk device.

BRIEF DESCRIPTION OF THE DRAWINGS

FIG. 15 is a diagram showing the relationship between the behavior displacement of the actuator assembly and the time at the time of the collision with the outer stopper.

FIG. 16A is a plan view schematically showing the behavior displacement of the actuator assembly at the time of the collision with the inner stopper and the auxiliary stopper.

FIG. 16B is a plan view schematically showing the behavior displacement of the distal end portion of the actuator assembly at the time of the collision with the inner stopper and the auxiliary stopper.

FIG. 19 is a cross-sectional view of the auxiliary stopper according to a modified example.

FIG. 20 is a plan view showing an actuator assembly and a housing in a state where the actuator assembly collides with an outer stopper in an HDD according to a third embodiment.

DETAILED DESCRIPTION

Figure 1:
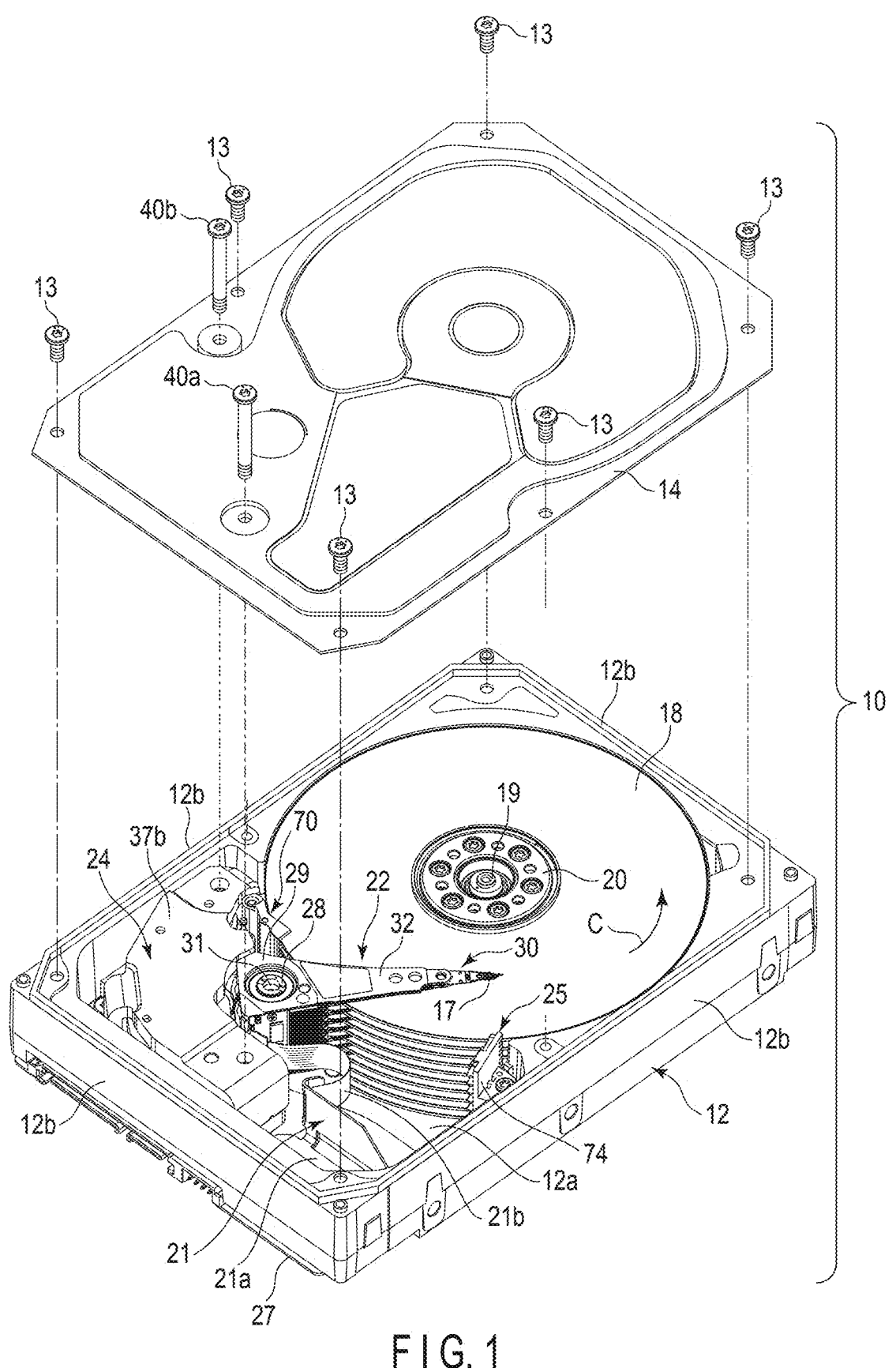
FIG. 1 is an exploded perspective view of a hard disk drive (HDD) in which a top cover is removed according to a first embodiment.

Various embodiments will be described hereinafter with reference to the accompanying drawings. In general, according to one embodiment, a disk device comprises a disk-shaped recording medium; an actuator assembly which is pivotably provided; a magnetic head supported in the actuator assembly; a first stopper which is provided contactably with the actuator assembly and defines a move of the actuator assembly in a first direction; and a first auxiliary stopper which is provided at a position where the actuator assembly comes into contact with the first auxiliary stopper after the actuator assembly comes into contact with the first stopper, and which defines the move of the actuator assembly in the first direction.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof may be omitted or simplified unless necessary.

First Embodiment

Figure 2:
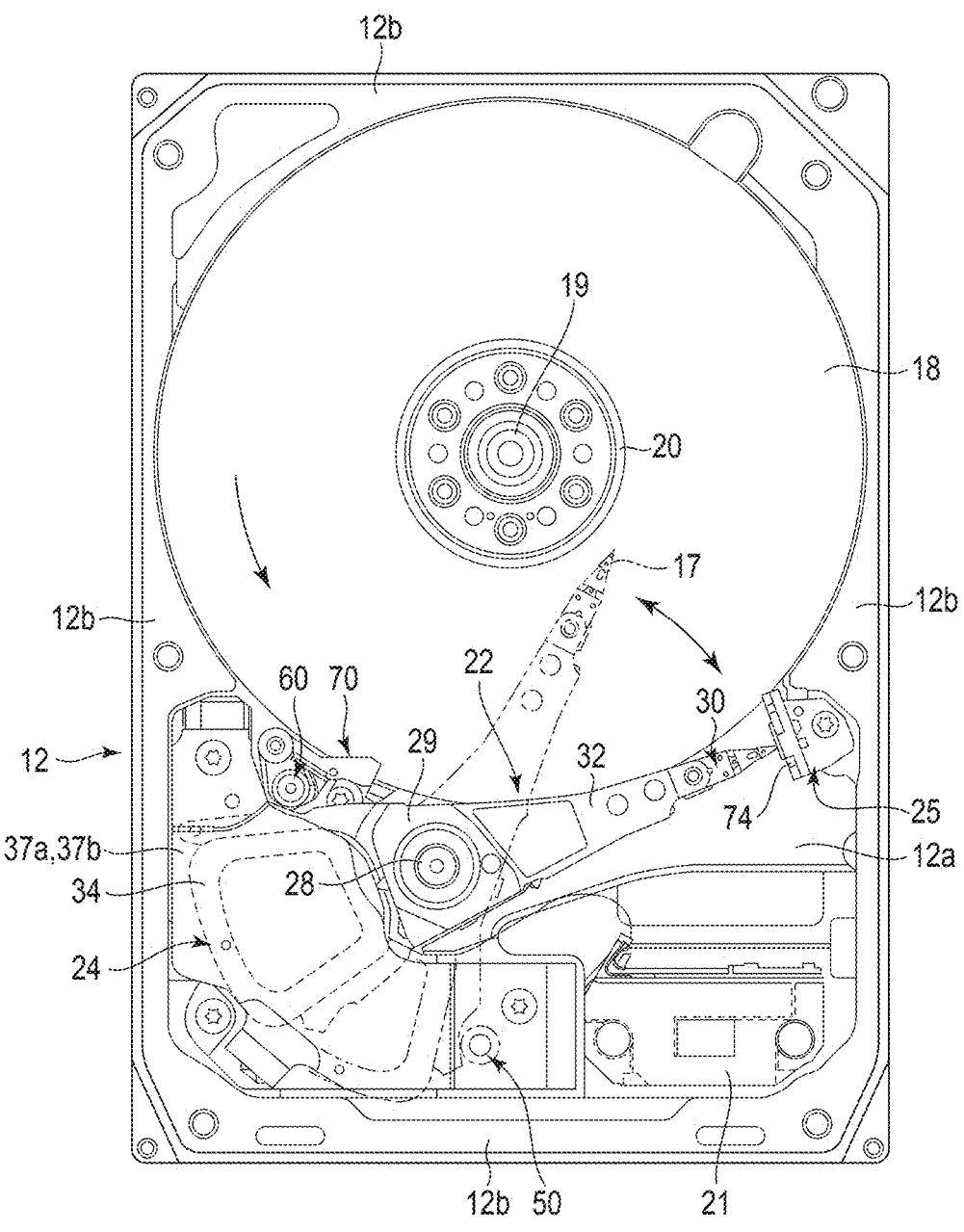
FIG. 2 is a plan view of the HDD.

As a disk device, this specification explains the details of a hard disk drive (HDD) according to a first embodiment. FIG. 1 is an exploded perspective view of the HDD of the first embodiment in which a cover is removed. FIG. 2 is a plan view of the HDD in a state where the cover is removed.

As shown in FIG. 1, the HDD comprises a housing 10 which is substantially rectangular. The housing 10 comprises a base 12 whose upper surface is open and which has the shape of a rectangular box, and the cover (top cover) 14 which is screwed to the base 12 by a plurality of screws 13 and with which the upper opening of the base 12 is closed. The base 12 comprises a rectangular bottom wall 12a which faces the cover 14 across an intervening gap and a sidewall 12b provided upright along the peripheral edge of the bottom wall 12a, and is integrally formed by, for example, an aluminum alloy. The sidewall 12b includes a pair of long-side walls which face each other and a pair of short-side walls which face each other. The cover 14 is formed into, for example, the shape of a rectangular plate by stainless steel. The peripheral portion of the cover 14 is screwed to the upper surface of the sidewall 12b by the screws 13.

A plurality of, for example, ten magnetic disks 18 as recording media having a disk-like shape and a spindle motor 19 which supports and rotates the magnetic disks 18 are provided in the housing 10. The spindle motor 19 is provided on the bottom wall 12a. Each magnetic disk 18 is formed into, for example, a discoid shape having a diameter of 90 mm (3.5 inches), and comprises a substrate formed of a nonmagnetic material such as glass or aluminum, and magnetic recording layers formed on the upper surface (first surface) and lower surface (second surface) of the substrate. The magnetic disks 18 are fitted to the hub of the spindle motor 19 coaxially with each other, and are further clamped by a clamp spring 20. By this structure, the magnetic disks 18 are supported in a state where they are located parallel to the bottom wall 12a of the base 12. The magnetic disks 18 are rotated with a predetermined number of rotations by the spindle motor 19. It should be noted that the number of mounted magnetic disks 18 is not limited to ten, and may be nine or less or eleven or more.

As shown in FIG. 1 and FIG. 2, a plurality of magnetic heads 17 which record and reproduce data for the magnetic disks 18 and an actuator assembly (head stack assembly [HSA]) 22 which movably supports these magnetic heads 17 for the magnetic disks 18 are provided in the housing 10. Further, in the housing 10 are provided a voice coil motor (VCM) 24 which causes the actuator assembly 22 to pivot and positions the actuator assembly 22, a ramp load mechanism 25 which holds the magnetic heads 17 at an unload position spaced apart from the magnetic disks 18 when the magnetic heads 17 move to the outermost circumferences of the magnetic disks 18, a substrate unit (FPC unit) 21 on which electronic components such as a conversion connector are mounted and a spoiler 70. It should be noted that the actuator assembly 22 and the VCM 24 constitute a head actuator.

A printed circuit board 27 is screwed to the outer surface of the bottom wall 12a of the base 12. The printed circuit board 27 constitutes a control unit. This control unit controls the operation of the spindle motor 19 and also controls the operation of the VCM 24 and the magnetic heads 17 via the substrate unit 21.

Figure 3:
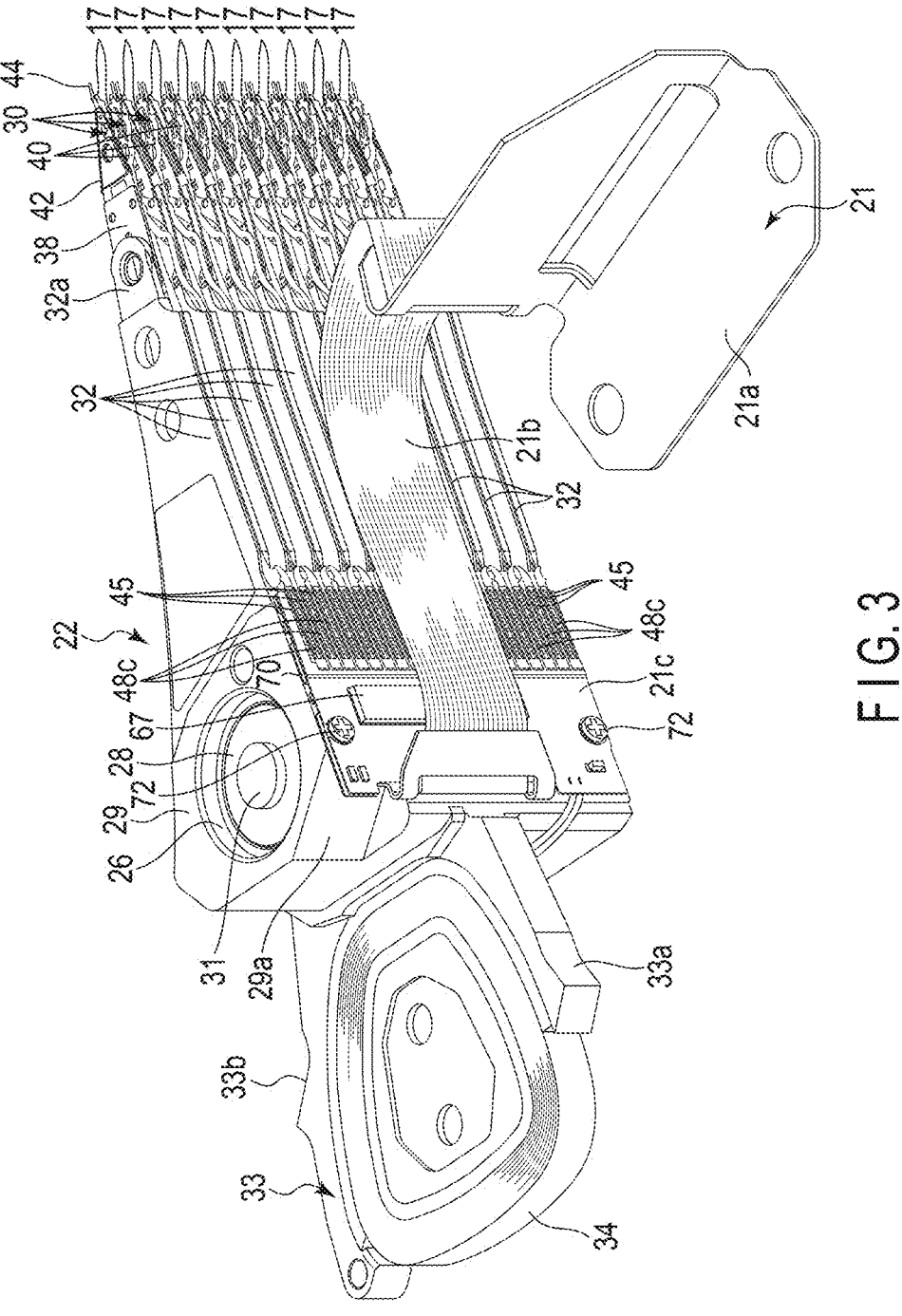
FIG. 3 is a perspective view showing the head actuator assembly and FPC unit of the HDD.

FIG. 3 is a perspective view showing the actuator assembly and the substrate unit. As shown in the figure, the actuator assembly 22 comprises an actuator block 29 which has a through hole 26, a bearing unit (unit bearings) 28 provided in the through hole 26, a plurality of, for example, eleven arms 32 which extend from the actuator block 29, suspension assemblies (head gimbal assemblies [HGAs]) 30 attached to the arms 32, and the magnetic heads 17 supported in the suspension assemblies 30. A support shaft (pivot shaft) 31 is provided upright on the bottom wall 12a of the base 12. The support shaft 31 is provided upright substantially perpendicular to the bottom wall 12a and substantially parallel to the rotation axis of the spindle motor 19. The actuator block 29 is pivotably supported by the bearing unit 28 around the support shaft 31.

In the embodiment, the actuator block 29 and the eleven arms 32 are integrally formed by aluminum etc., and constitute an E-block. Each arm 32 is formed into, for example, the shape of a slender flat plate, and extends from the actuator block 29 in a direction orthogonal to the support shaft 31. The eleven arms 32 are provided parallel to each other across an intervening gap. In the embodiment, the corner portion of the actuator block 29 on the top cover side and further on the support frame 33 side is chamfered to form a flat contact surface 29a.

The actuator assembly 22 comprises the bifurcated support frame 33 which extends from the actuator block 29 in a direction opposite to the arms 32. A voice coil 34 which constitutes part of the VCM 24 is supported by the support frame 33. The support frame 33 comprises a first contact portion 33a which is contactable with an inner stopper as described later, and a second contact portion 33b which is contactable with an outer stopper as described later. As shown in FIG. 2, the voice coil 34 is located between a pair of yokes 37a and 37b. One of the yokes 37a and 37b is secured onto the base 12. The voice coil 34 constitutes the VCM 24 together with these yokes 37a and 37b and a magnet secured to one of the yokes.

As shown in FIG. 3, the actuator assembly 22 comprises twenty suspension assemblies 30 which support the magnetic heads 17. The suspension assemblies 30 are attached to the extension ends 32a of the arms 32. The suspension assemblies 30 include up-head suspension assemblies which support the magnetic heads 17 upward, and down-head suspension assemblies which support the magnetic heads 17 downward. These up-head suspension assemblies and down-head suspension assemblies are prepared by arranging the suspension assemblies 30 having the same structure while changing the vertical direction.

In the embodiment, in FIG. 3, a down-head suspension assembly 30 is attached to the topmost arm 32, and an up-head suspension assembly 30 is attached to the lowermost arm 32. An up-head suspension assembly 30 and a down-head suspension assembly 30 is attached to each of the nine arms 32 located in the middle.

Each suspension assembly 30 comprises a base plate 38 which is substantially rectangular, a load beam 42 formed of a slender plate spring, and a flexure (wiring member) 40 having the shape of a slender belt. The flexure 40 comprises a displaceable gimbal portion. The magnetic heads 17 are placed on these gimbal portions. The proximal end portion of each base plate 38 is secured to the extension end 32a of the arm 32. The load beam 42 extends from the base plate 38 and is tapered toward the extension end. The base plate 38 and the load beam 42 are formed of, for example, stainless steel.

Each load beam 42 generates a spring force (reaction force) which biases the magnetic head 17 toward the surface of the magnetic disk 18. A tab 44 protrudes from the distal end of the load beam 42. The tab 44 can be fitted into a ramp 74 as described later, and constitutes the ramp load mechanism 25 together with the ramp 74.

As shown in FIG. 3, the FPC unit 21 integrally comprises a base portion 21a which is bent in an L-shape and substantially rectangular, a relay portion 21b which extends from a side edge of the base portion 21a and has the shape of a slender belt, and a joint portion 21c continuously provided at the distal end of the relay portion 21b. The base portion 21a, the relay portion 21b and the joint portion 21c are formed by a flexible printed circuit (FPC). The flexible printed circuit has an insulating layer formed of polyimide, a conductive layer formed on the insulating layer and forming conductive lines, connection pads and the like, and a protective layer which covers the conductive layer.

Electronic components such as a conversion connector and a plurality of capacitors (not shown) are mounted on the base portion 21a and are electrically connected to conductive lines (not shown). A metal plate which functions as a reinforcing plate is attached to the base portion 21a. The base portion 21a is provided on the bottom wall 12a of the base 12. The relay portion 21b extends from a side edge of the base portion 21a toward the actuator block 29 of the actuator assembly 22. The joint portion 21c provided at the extension end of the relay portion 21b is attached to the installation surface of the actuator block 29 and is further secured to the installation surface by a securing screw 72. A large number of connection pads are provided in the joint portion 21c. For example, a head IC (head amplifier) 67 is mounted on the joint portion 21c. This head IC 67 is connected to the connection pads and the base portion 21a via conductive lines. Further, the voice coil 34 is connected to the joint portion 21c.

The flexure 40 of each suspension assembly 30 comprises an end portion which is electrically connected to the magnetic head 17, the other end portion which extends to the actuator block 29 through a groove formed in the side edge of the arm 32, and a connection end portion (tail connection terminal portion) 48c provided in the other end portion. The connection end portion 48c is formed into a slender rectangular shape. A plurality of, for example, thirteen connection terminals (connection pads) 45 are provided on the connection end portion 48c. These connection terminals 45 are connected to the conductive lines of the flexure 40. In other words, the conductive lines of the flexure 40 extend over substantially the entire length of the flexure 40. An end of each conductive line of the flexure 40 is electrically connected to the magnetic head 17, and the other end is connected to the connection terminal (connection pad) 45.

The connection terminals 45 provided in the connection end portion 48c are bonded to the connection pads of the joint portion 21c and are electrically connected to the conductive lines of the joint portion 21c via the connection pads. By this structure, the twenty magnetic heads 17 of the actuator assembly 22 are electrically connected to the base portion 21a through the conductive lines and connection end portions 48c of the flexures 40 and the joint portion 21c and relay portion 21b of the FPC unit 21.

As shown in FIG. 1 and FIG. 2, the actuator assembly 22 is pivotably supported around the support shaft 31. The actuator assembly 22 is pivotable between an unload position (shown by the solid lines in FIG. 2) at which the magnetic heads 17 are unloaded on the external side of the outermost circumferences of the magnetic disks 18 and an inner circumferential position (shown by the two-dot and dashed line in FIG. 2) at which the magnetic heads 17 are located on the innermost circumferential side of the magnetic disks 18. Each magnetic disk 18 is located between two suspension assemblies 30. When the HDD operates, the magnetic heads 17 supported by two suspension assemblies 30 face the upper and lower surfaces of the magnetic disk 18.

The ramp load mechanism 25 comprises the ramp 74. As shown in FIG. 1, the ramp 74 is secured to the base 12 and is located near the peripheral portion of the magnetic disks 18. When the HDD does not operate, and the magnetic heads 17 are off the outer circumferences of the magnetic disks 18 and move to a predetermined unload position, the tabs 44 of the suspension assemblies 30 run on the ramp 74. By this configuration, the magnetic heads 17 are held at an unload position spaced apart from the magnetic disks 18.

Figure 4:
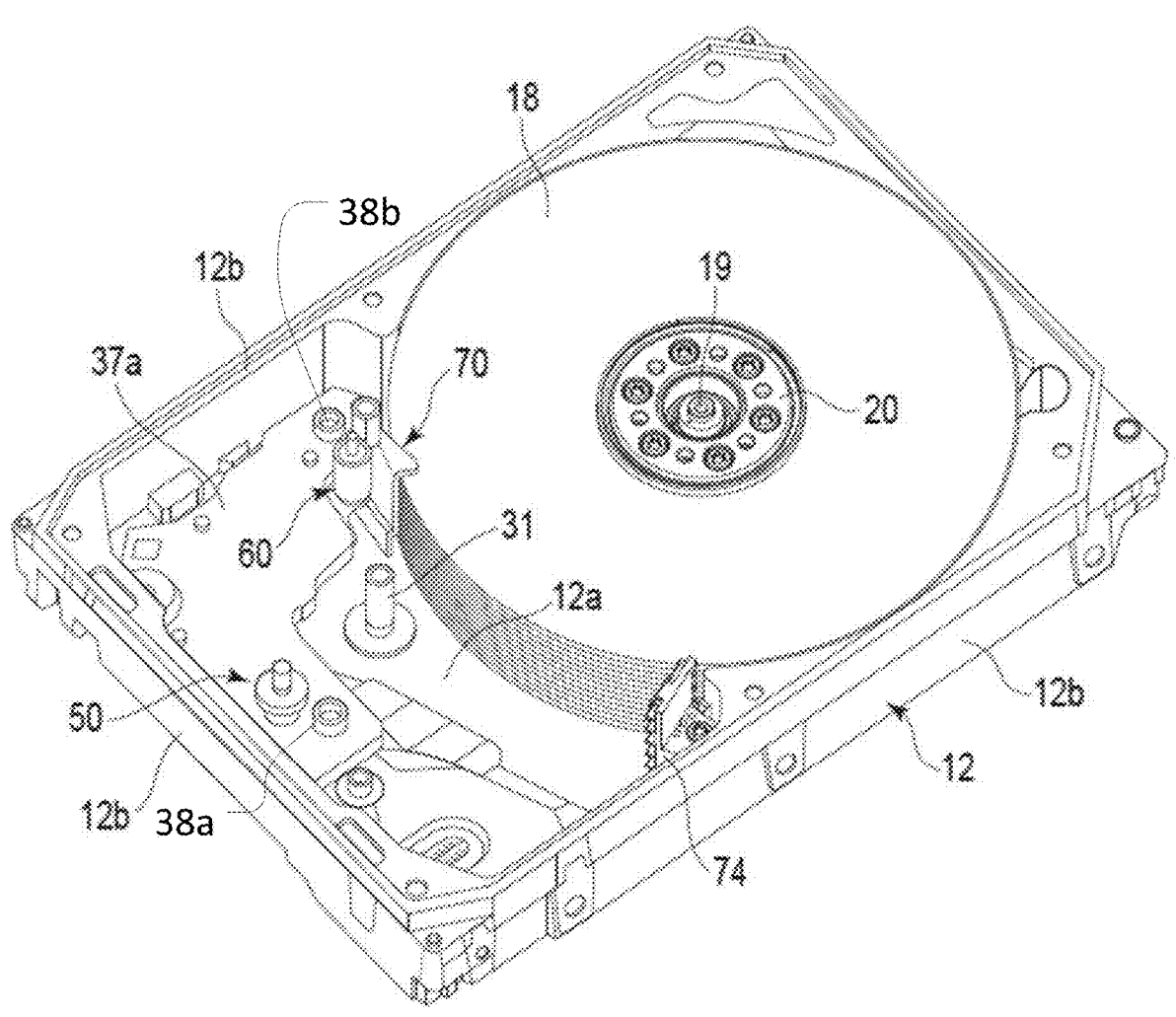
FIG. 4 is a perspective view of the HDD in a state where the head actuator assembly, the FPC unit and an upper yoke are removed.

FIG. 4 is a perspective view of the HDD in a state where the actuator assembly, the FPC unit and the upper yoke 37b are removed. As shown in the figure, of the pair of yokes constituting the VCM 24, the lower yoke 37a is provided on the bottom wall 12a of the base 12 and is secured to the bottom wall 12a. The lower yoke 37a is, for example, a flat plate having substantially an L-shape, and is provided along the corner portion of the bottom wall 12a. Support sleeves 38a and 38b are provided upright in an end portion and the other end portion of the lower yoke 37a. As shown in FIG. 1 and FIG. 2, the upper yoke 37b comprises a flat plate having the same shape as the lower yoke 37a, and a pair of leg portions which extend from the both ends of the flat plate. The upper yoke 37b is provided so as to overlap the lower yoke 37a. Further, the upper yoke 37b is secured to the lower yoke 37a and the bottom wall 12a by two securing screws 40a and 40b screwed to the bottom wall 12a through the cover 14, the upper yoke 37b, the support sleeves 38a and 38b and the lower yoke 37a. For example, a permanent magnet (not shown) is provided on the upper surface of the lower yoke 37a and the lower surface of the upper yoke 37b.

As shown in FIG. 2 and FIG. 4, the HDD comprises the inner stopper (first stopper) 50 and the outer stopper (second stopper) 60 defining the moving range (pivotable range) of the actuator assembly 22. For example, the inner stopper 50 is provided upright in the lower yoke 37a. For example, the outer stopper 60 is provided upright on the bottom wall 12a near the lower yoke 37a.

As shown in FIG. 2, the inner stopper 50 is provided at a position where the first contact portion 33a of the support frame 33 in the actuator assembly 22 comes into contact with the inner stopper 50 when the magnetic heads 17 move to the inner circumferential side (first direction) of the magnetic disks 18 and are located in the innermost circumferential portions of the magnetic disks 18. Thus, the inner stopper 50 restricts the range in which the magnetic heads 17 and the actuator assembly 22 move to the inner circumferential side (first direction).

The outer stopper 60 is provided at a position where the second contact portion 33*b* of the support frame 33 comes into contact with the outer stopper 60 when the magnetic heads 17 move to the outer circumferential side (second direction) of the magnetic disks 18 and are retracted in a parking area (unload position) on the ramp 74. Thus, the outer stopper 60 restricts the range in which the magnetic heads 17 and the actuator assembly 22 move to the outer circumferential side (second direction). This configuration prevents the deviation of the magnetic heads 17 from the ramp 74. In this manner, the moving range (pivotable range) of the actuator assembly 22 and the magnetic heads 17 is defined by the inner stopper 50 and the outer stopper 60.

Now, this specification explains examples of the inner stopper 50 and the outer stopper 60.

Figure 5:
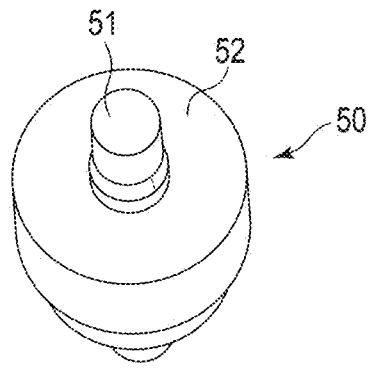
FIG. 5 is a perspective view of an inner stopper (second stopper).

FIG. 5 is a perspective view showing the inner stopper. As shown in the figure, the inner stopper 50 comprises a stopper pin 51 and a buffer member 52 attached to the stopper pin 51. The stopper pin 51 has an end portion fitted into a through hole of the lower yoke 37*a* and the other end portion fitted into a through hole of the upper yoke 37*b*, and is provided upright substantially perpendicularly to the lower yoke 37*a*.

For example, the buffer member 52 is formed into a cylindrical shape. The buffer member 52 is attached to the stopper pin 51 in a state where its inner circumferential surface is attached firmly to the circumferential surface of the stopper pin 51. Part of the outer circumferential surface of the buffer member 52 constitutes a contact surface with which the first contact portion 33*a* of the actuator assembly 22 comes into contact. The buffer member 52 is formed of, for example, a buffer material having elasticity such as rubber or an elastomer. It should be noted that the shape of the buffer member 52 is not limited to a cylindrical shape. Various types of shapes can be applied to the shape of the buffer member 52.

Figure 6A:
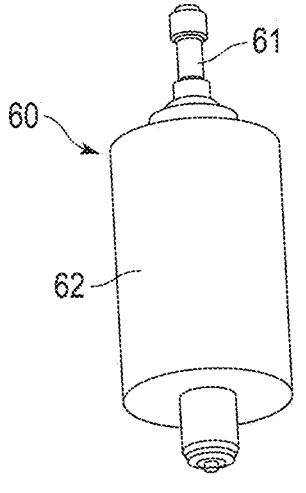
FIG. 6A is a perspective view of an outer stopper (first stopper).
Figure 6B:
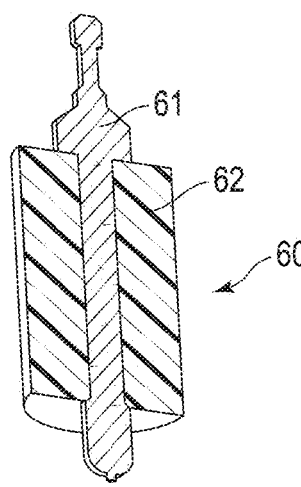
FIG. 6B is a longitudinal sectional view of the outer stopper (first stopper).

FIG. 6A is a perspective view of the outer stopper. FIG. 6B is a longitudinal sectional view of the outer stopper.

As shown in the figures, the outer stopper 60 includes a stopper pin 61 and a buffer member 62 attached to the stopper pin 61. The stopper pin 61 has an end portion fitted into the recess portion of the bottom wall 12*a* and the other end portion fitted into the cover 14, and is provided upright substantially perpendicularly to the bottom wall 12*a*.

For example, the buffer member 62 is formed into a cylindrical shape. The buffer member 62 is attached to the stopper pin 61 in a state where its inner circumferential surface is attached firmly to the circumferential surface of the stopper pin 61. Part of the outer circumferential surface of the buffer member 62 constitutes a contact surface with which the second contact portion 33*b* of the actuator assembly 22 comes into contact. The buffer member 62 is formed of, for example, a buffer material having elasticity such as rubber or an elastomer. It should be noted that the shape of the buffer member 62 is not limited to a cylindrical shape. Various types of shapes can be applied to the shape of the buffer member 62.

Figure 7:
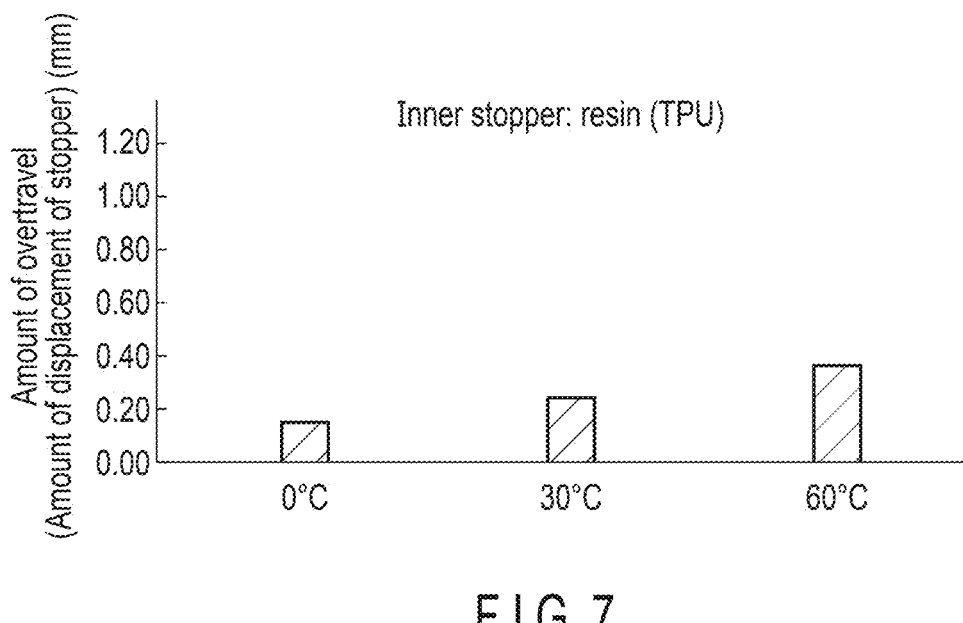
FIG. 7 is a diagram showing the relationship between the amount of overtravel and the temperature at the time of the collision of the inner stopper according to the embodiment.

FIG. 7 is a diagram showing the relationship between the amount of overtravel (the amount of displacement of the stopper) and the temperature at the time of the collision of the inner stopper according to the embodiment. In the example of the figure, resin, for example, thermoplastic polyurethane (TPU) is used for the buffer member 52 of the inner stopper 50. FIG. 7 shows that the amount of displacement (the amount of deformation or the amount of over-travel) of the inner stopper (buffer member 52) at the time of collision increases with increasing temperature.

Figure 8:
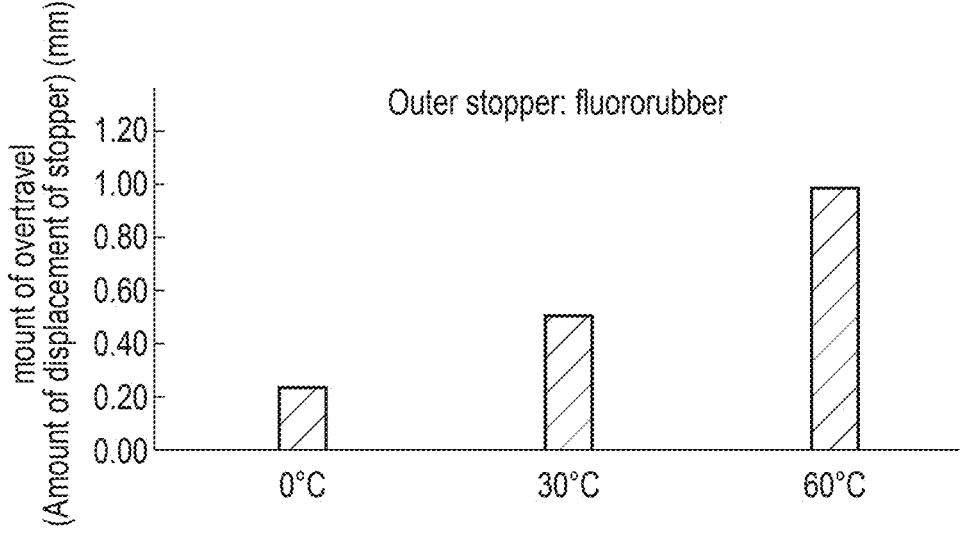
FIG. 8 is a diagram showing the relationship between the amount of overtravel and the temperature at the time of the collision of the outer stopper according to the embodiment.

FIG. 8 is a diagram showing the relationship between the amount of overtravel (the amount of displacement of the stopper) and the temperature at the time of the collision of the outer stopper according to the embodiment. In the example of FIG. 8 where rubber, for example, fluororubber is used for the buffer member 62 of the outer stopper 60, it is clear that the amount of displacement (the amount of deformation or the amount of overtravel) of the outer stopper (buffer member 62) at the time of collision increases with increasing temperature.

The HDD of the embodiment further comprises an auxiliary inner stopper (first auxiliary stopper) 54 and an auxiliary outer stopper (second auxiliary stopper) 64 defining the moving range (pivotable range) of the actuator assembly 22. The auxiliary stoppers 54 and 64 are explained in detail below.

Figure 9:
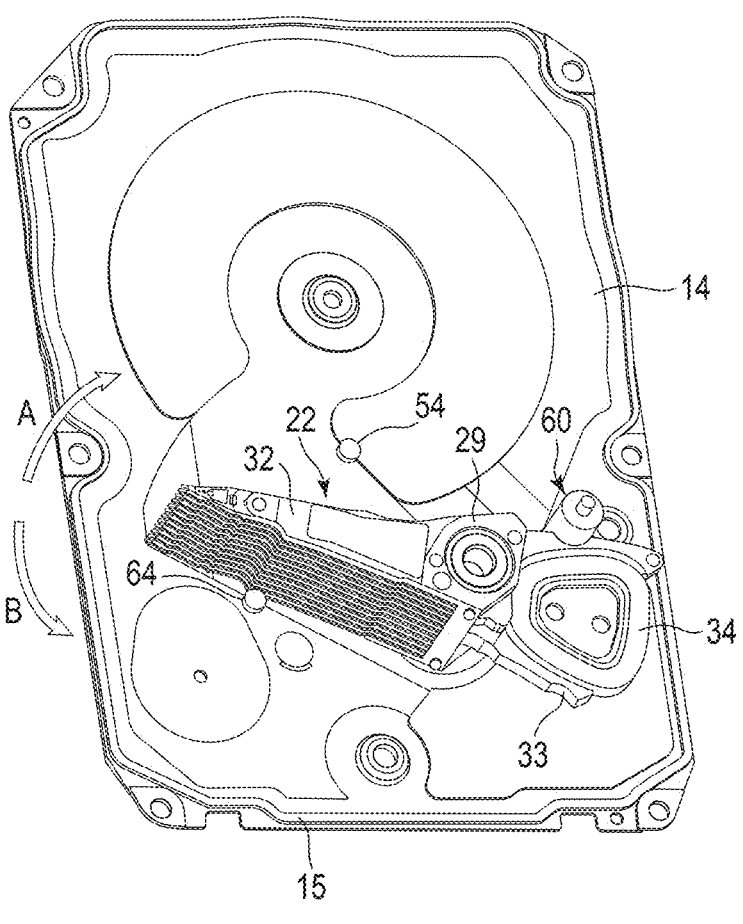
FIG. 9 is a perspective view showing the layout relationships of the inner surface of the top cover, a head actuator and auxiliary stoppers.
Figure 10:
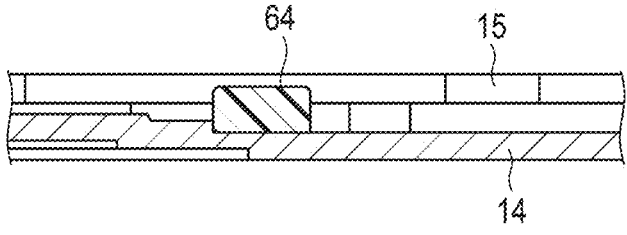
FIG. 10 is a cross-sectional view of the top cover and the auxiliary stopper.

FIG. 9 is a perspective view schematically showing the inner surface side of the cover, the actuator assembly and the outer stopper. FIG. 10 is a cross-sectional view of the auxiliary outer stopper.

As shown in FIG. 9, the top cover 14 of the housing 10 comprises a gasket 15 provided along the peripheral edge portion of the inner surface of the top cover 14. When the top cover 14 is secured to the base 12, the gasket 15 is attached firmly to the end surface of the sidewall 12*b* of the base 12. The gasket 15 is formed by, for example, applying a resin-based, rubber-based or silicon-based liquid gasket (e.g., Formed in Place Gasket: FIPG).

The auxiliary inner stopper 54 and the auxiliary outer stopper 64 are provided on the inner surface of the top cover 14. The auxiliary inner stopper 54 and the auxiliary outer stopper 64 are formed of, for example, a liquid gasket (e.g., FIPG) which is similar to the gasket 15, and are attached to the inner surface of the cover 14. As shown in FIG. 10, each of the auxiliary inner stopper 54 and the auxiliary outer stopper 64 is formed into, for example, a columnar shape, and has a central axis and an outer circumferential surface orthogonal to the inner surface of the cover 14.

In the embodiment, for example, when the hardness (the hardness measured by a type A durometer; the same in the following descriptions) of the buffer member 62 of the outer stopper 60 is assumed to be 60, and the hardness of the buffer member 52 of the inner stopper 50 is assumed to be 90, the hardness of the auxiliary inner stopper 54 and the auxiliary outer stopper 64 are 30. Thus, in the embodiment, each of the auxiliary stoppers 54 and 64 is formed of a material in which the hardness is lower than the inner stopper 50 and the outer stopper 60.

Figure 11:
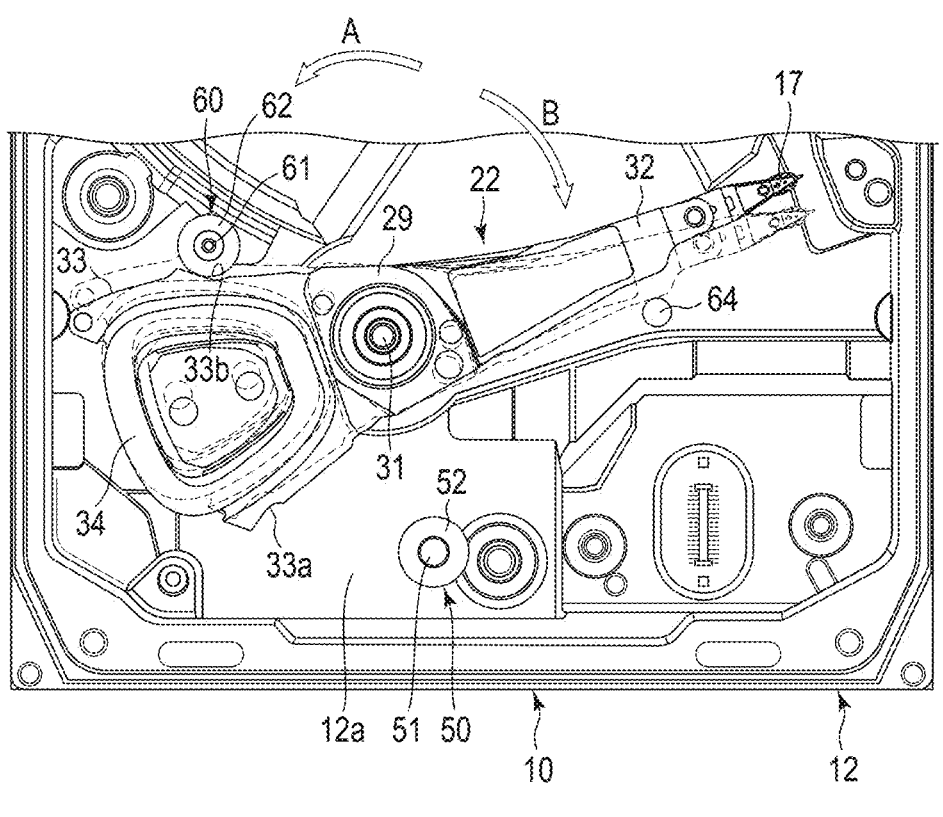
FIG. 11 is a plan view showing the actuator assembly and a housing in a state where the actuator assembly collides with the outer stopper.
Figure 12:
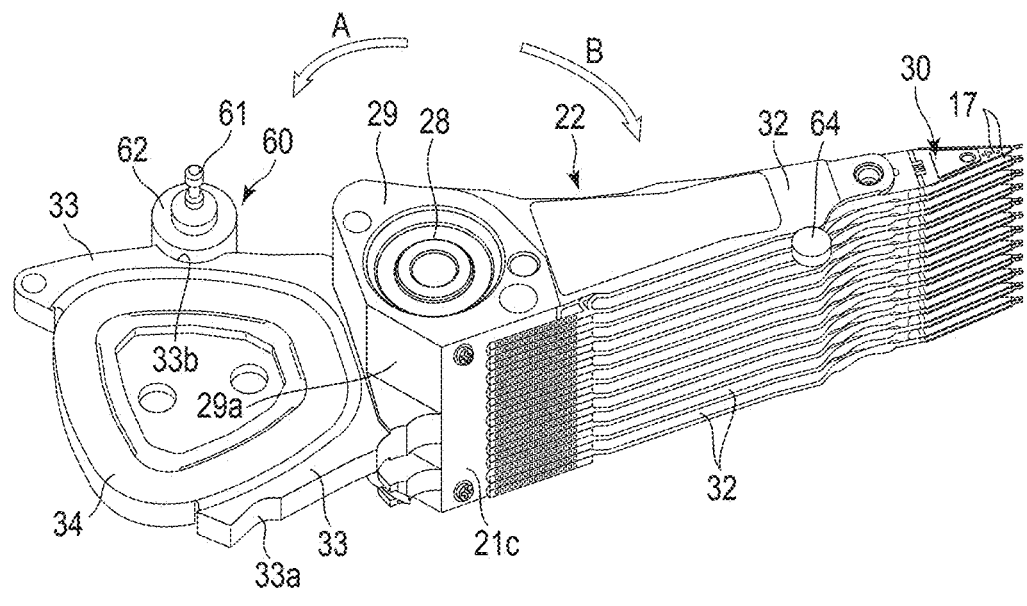
FIG. 12 is a perspective view showing the actuator assembly, the outer stopper and the auxiliary stopper.

FIG. 11 is a plan view of the housing and schematically shows the actuator assembly in a state where it is in contact with the outer stopper 60, and the auxiliary outer stopper 64. FIG. 12 is a perspective view showing the actuator assembly, the outer stopper and the auxiliary outer stopper 64.

As shown in FIG. 9, FIG. 11 and FIG. 12, in a case where the counterclockwise direction (inner circumferential side direction) is defined as the first direction A around the pivot shaft 31 which is the pivot of the actuator assembly 22, and the clockwise direction (outer circumferential side direction) is defined as the second direction B, the outer stopper 60 is provided at a position where the second contact portion 33*b* of the frame 33 comes into contact with the outer stopper 60 when the actuator assembly 22 pivots to the maximum pivotable limit in the second direction B. As described later, when the second contact portion 33*b* collides with the buffer member 62 of the outer stopper 60, the buffer member 62 is pressed in the second direction B and elastically deforms in the second direction B. In this manner, as shown by the broken lines of FIG. 11, the actuator assembly 22 including the magnetic heads 17 moves in the second direction B by the amount of the elastic deformation of the buffer member 62 after the collision with the outer stopper 60.

The auxiliary outer stopper 64 is provided at a position where the actuator assembly 22 comes into contact with the auxiliary outer stopper 64 when the actuator assembly 22 further moves in the second direction after the actuator assembly 22 comes into contact with the outer stopper 60. Thus, the auxiliary outer stopper 64 restricts the move of the actuator assembly 22 in the second direction B. In the embodiment, the auxiliary outer stopper 64 is provided at a position where it collides with the distal end portion and the side edge of the topmost arm 32 (on the cover 14 side).

FIG. 15 shows the behavior of the actuator assembly 22 when the actuator assembly collides with the outer stopper 60 and the behavior of the actuator assembly in a case where the auxiliary outer stopper 64 is provided. In FIG. 15, the broken line shows the behavior of the actuator assembly in a case where only the outer stopper 60 is provided. When the actuator assembly collides with the outer stopper 60 at a speed of, for example, 2 m/s (line B: collision position), the actuator assembly further moves from line B to the position of line A in the second direction B. The maximum amount of displacement at this time is defined as MS. After the actuator assembly is returned from the position of line A to the line B side by the reaction of the buffer member 62, the actuator assembly moves to the line A side again. The actuator assembly converges on the position of line B while repeating this operation a plurality of times.

In FIG. 15, the solid line shows the behavior of the actuator assembly in a case where the outer stopper 60 and the auxiliary stopper 64 are provided like the embodiment. After the actuator assembly collides with the outer stopper 60 at the position of line B at a speed of, for example, 2 m/s, the actuator assembly collides with the auxiliary outer stopper 64 at the position of line C. After the actuator assembly slightly moves from collision position C in the second direction B by the elastic deformation of the auxiliary outer stopper 64, the actuator assembly is returned to the line B side by the reaction of the auxiliary outer stopper 64. Subsequently, the actuator assembly moves to the line C side again. The actuator assembly converges on the position of line B while repeating this operation a plurality of times.

As described above, the auxiliary outer stopper 64 is provided at a position where it comes into contact with the actuator assembly 22 in the range of the maximum amount of displacement MS of the outer stopper 60, for example, at the position of line C. In other words, the auxiliary outer stopper 64 is provided at a position where it comes into contact with the actuator assembly 22 before the outer stopper 60 is completely elastically displaced. In addition, the figure shows that the amount of displacement of the actuator assembly 22 at the time of the collision with the outer stopper is reduced by providing the auxiliary outer stopper 64, and further, the behavior of the actuator assembly is converged in a shorter time.

Figure 13:
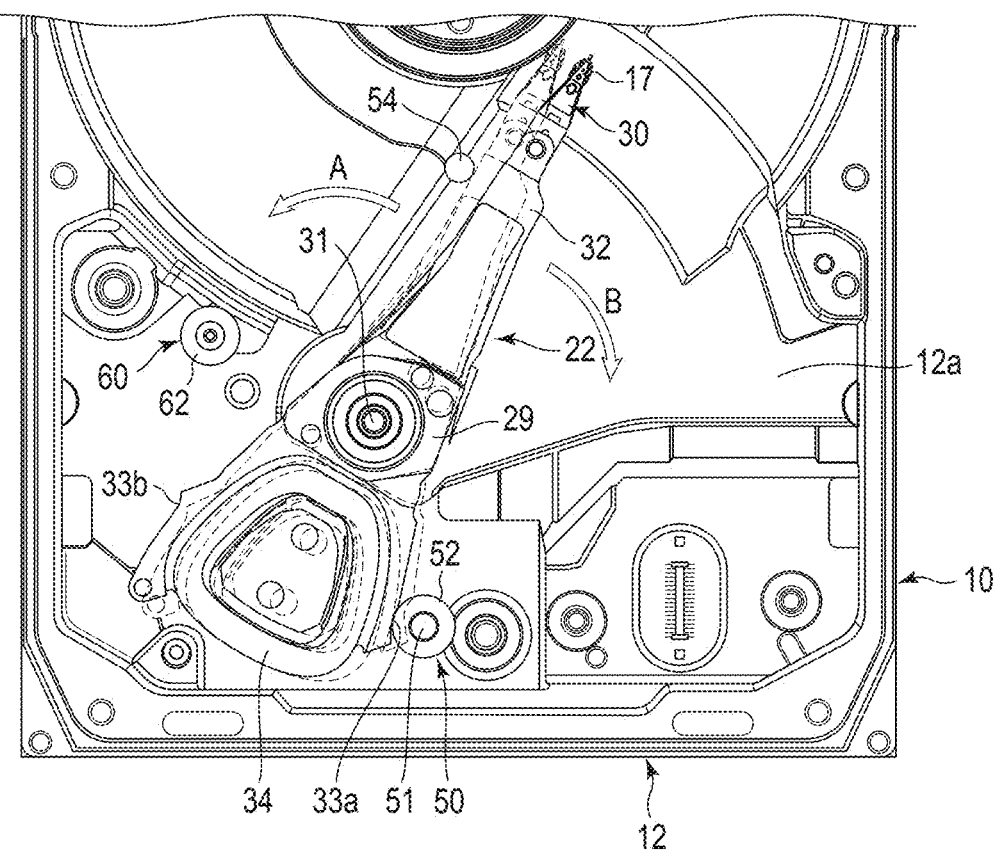
FIG. 13 is a plan view showing the actuator assembly and the housing in a state where the actuator assembly collides with the inner stopper.
Figure 14:
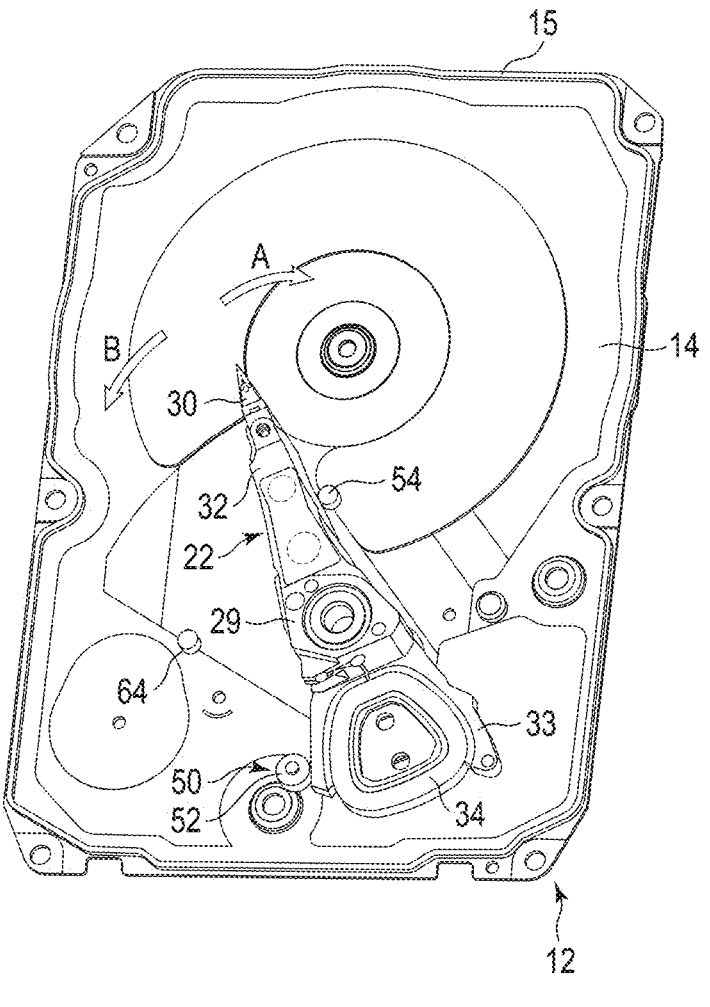
FIG. 14 is a perspective view showing the layout relationships of the inner surface of the top cover, the actuator assembly, the inner stopper and the auxiliary inner stopper.

FIG. 13 is a plan view showing the actuator assembly and the housing in a state where the actuator assembly collides with the inner stopper. FIG. 14 is a perspective view showing the layout relationships of the inner surface of the top cover, the actuator assembly, the inner stopper and the auxiliary inner stopper. FIG. 16A is a plan view schematically showing the behavior displacement of the actuator assembly at the time of the collision with the inner stopper and the auxiliary inner stopper.

As shown in FIG. 13 and FIG. 14, the inner stopper 50 is provided at a position where the first contact portion 33a of the frame 33 comes into contact with the inner stopper 50 when the actuator assembly 22 pivots to the maximum pivotable limit of the first direction A. The buffer member 52 of the inner stopper 50 is pressed in the first direction A and elastically deforms in the first direction at the time of the collision of the first contact portion 33a. In this manner, as shown by the broken lines of FIG. 13, the actuator assembly 22 including the magnetic heads 17 moves in the first direction A by the amount of the elastic deformation of the buffer member 52 after the collision with the inner stopper 50.

As shown in FIG. 13, FIG. 14 and FIG. 16, the auxiliary inner stopper 54 is provided at a position where the actuator assembly 22 comes into contact with the auxiliary inner stopper 54 when the actuator assembly 22 further moves in the first direction A after the actuator assembly 22 comes into contact with the inner stopper 50. Thus, the auxiliary inner stopper 54 restricts the move of the actuator assembly 22 in the first direction A. In the embodiment, the auxiliary inner stopper 54 is provided at a position which collides with a side edge of the distal end portion of the topmost arm 32 (on the cover 14 side).

In a manner similar to that of the auxiliary outer stopper 64, the auxiliary inner stopper 54 is provided at a position where it comes into contact with the actuator assembly 22 in the range of the maximum amount of displacement of the inner stopper 50, for example, at the intermediate position of the amount of displacement. In other words, the auxiliary inner stopper 54 is provided at a position where it comes into contact with the actuator assembly 22 before the inner stopper 50 is completely elastically displaced. In a manner similar to that of the behavior of the actuator assembly at the time of the collision of the outer stopper shown in FIG. 15, the amount of displacement of the actuator assembly 22 at the time of the collision with the inner stopper 50 is reduced by providing the auxiliary inner stopper 54, and further, the behavior of the actuator assembly is converged in a shorter time.

In the HDD of the first embodiment configured as described above, the amount of displacement of the actuator assembly 22 and the magnetic heads 17 at the time of the collision with the stoppers can be considerably reduced by providing the auxiliary inner stopper 54 and the auxiliary outer stopper 64. By this configuration, the contact margin between the actuator assembly 22 and the magnetic heads 17 and the other components such as the magnetic circuit and the recording medium can be set so as to be small. In this manner, the data area of the recording medium can be increased. At the same time, the degree of freedom of the design of the other components can be improved.

Further, as the amount of displacement of the actuator assembly 22 can be reduced by the auxiliary stoppers 54 and 64, the selection range of the materials of the buffer members 52 and 62 of the outer stopper 60 and the inner stopper 50 can be enlarged. For example, materials in which the amount of outgassing is less can be selected. By using these materials, the effect of outgassed component is reduced, thereby improving the reliability and life of the magnetic disk device.

As described above, according to the first embodiment, there can be obtained a disk device in which the amount of displacement of stoppers at the time of collision can be reduced.

In the HDD of the embodiment, both the auxiliary inner stopper and the auxiliary outer stopper are provided. However, the configuration is not limited to this example. Only one of the auxiliary inner stopper 54 and the auxiliary outer stopper 64 may be provided. Even in this case, the amount of displacement at the time of the collision of the actuator assembly on the inner side or the outer side can be reduced, thereby reducing the margin setting amount.

Moreover, the auxiliary inner stopper or the auxiliary outer stopper is not limited to the configuration in which the hardness is lower than that of the outer stopper or the inner stopper. Each of them may be formed of a material in which the hardness is higher than the hardness of the outer stopper and the inner stopper.

Now, this specification explains HDDs according to other embodiments. In the embodiments described below, portions equivalent to those of the first embodiment described above are denoted by the same reference numbers, and detailed explanation thereof is omitted or simplified, such explanation being mainly given to portions different from those of the first embodiment.

Second Embodiment

Figure 17:
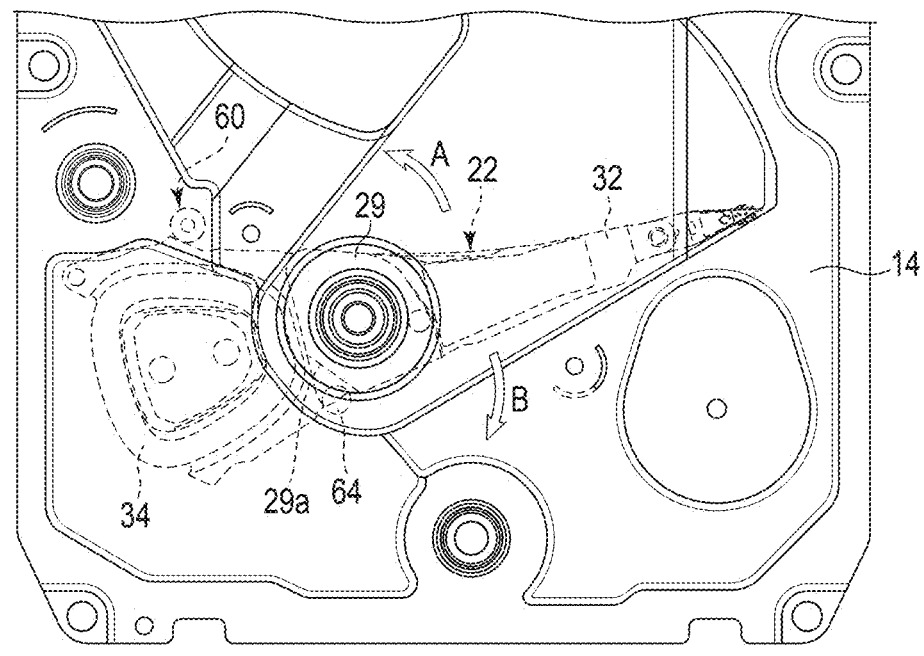
FIG. 17 is a plan view showing an actuator assembly and a housing in a state where the actuator assembly collides with an outer stopper in an HDD according to a second embodiment.
Figure 18:
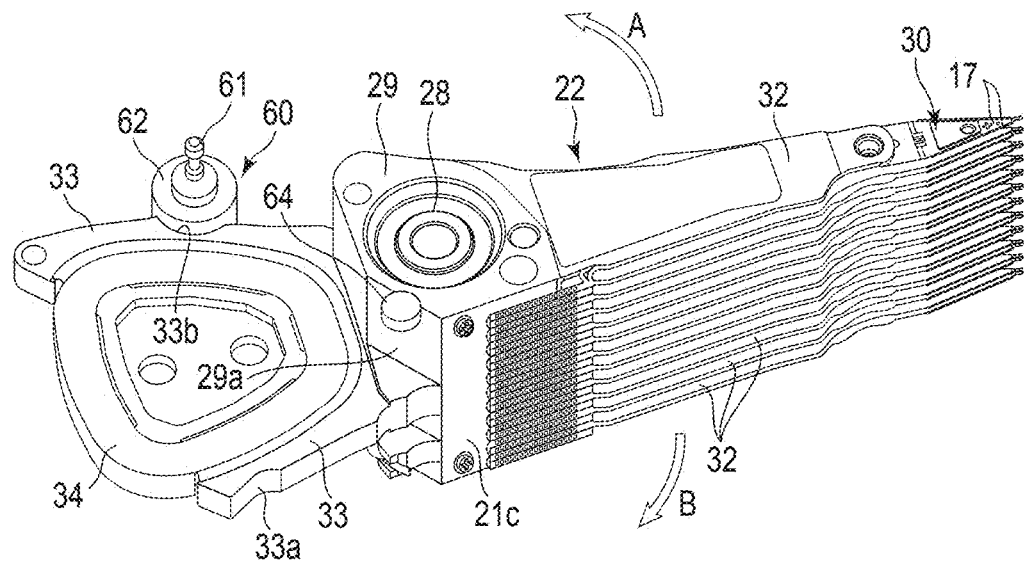
FIG. 18 is a perspective view showing the actuator assembly, the outer stopper and an auxiliary stopper according to the second embodiment.

FIG. 17 is a plan view showing an actuator assembly and a housing in a state where the actuator assembly collides with an outer stopper in an HDD according to a second embodiment. FIG. 18 is a perspective view showing the actuator assembly, the outer stopper and an auxiliary stopper according to the second embodiment.

As shown in the figures, in the second embodiment, the auxiliary outer stopper 64 provided on the inner surface of a top cover 14 is provided at a position where it is contactable with the contact surface 29a of an actuator block 29 instead of the arm 32 of the actuator assembly 22. More specifically, the auxiliary outer stopper 64 is formed into, for example, a columnar shape by a liquid gasket dropped on the inner surface of the top cover 14, and has a central axis and an outer circumferential surface orthogonal to the inner surface of the cover 14. The auxiliary outer stopper 64 is provided at a position where the contact surface 29a of the actuator assembly 22 comes into contact with the auxiliary outer stopper 64 when the actuator assembly 22 further moves in a second direction B after the actuator assembly 22 comes into contact with the outer stopper 60. Thus, the auxiliary outer stopper 64 restricts the move of the actuator assembly 22 in the second direction B. In other words, the auxiliary outer stopper 64 is provided at a position where it comes into contact with the contact surface 29a of the actuator assembly 22 before the outer stopper 60 is completely elastically displaced.

In the second embodiment, the other configurations of the HDD are the same as the HDD of the first embodiment described above. In addition, effects similar to those of the first embodiment described above can be obtained from the second embodiment. Thus, the disk device in which the amount of displacement of the actuator assembly 22 and magnetic heads 17 at the time of the collision with the stoppers can be considerably reduced can be obtained.

Modified Example

FIG. 19 is a cross-sectional view of the auxiliary stopper according to a modified example.

As shown in the figure, the auxiliary inner stopper 54 and/or auxiliary outer stopper 64 may include a stopper pin 55 as a core. The stopper pin 55 is integrally formed with the top cover 14 and is provided upright substantially perpendicularly to the top cover 14. The auxiliary inner stopper 54 and/or the auxiliary outer stopper 64 are/is formed so as to overlap the stopper pin 55 and cover/covers the stopper pin 55.

As the stopper pin 55 is provided, the auxiliary inner stopper 54 and/or the auxiliary outer stopper 64 can be further firmly secured by the top cover 14.

Third Embodiment

Figure 21:
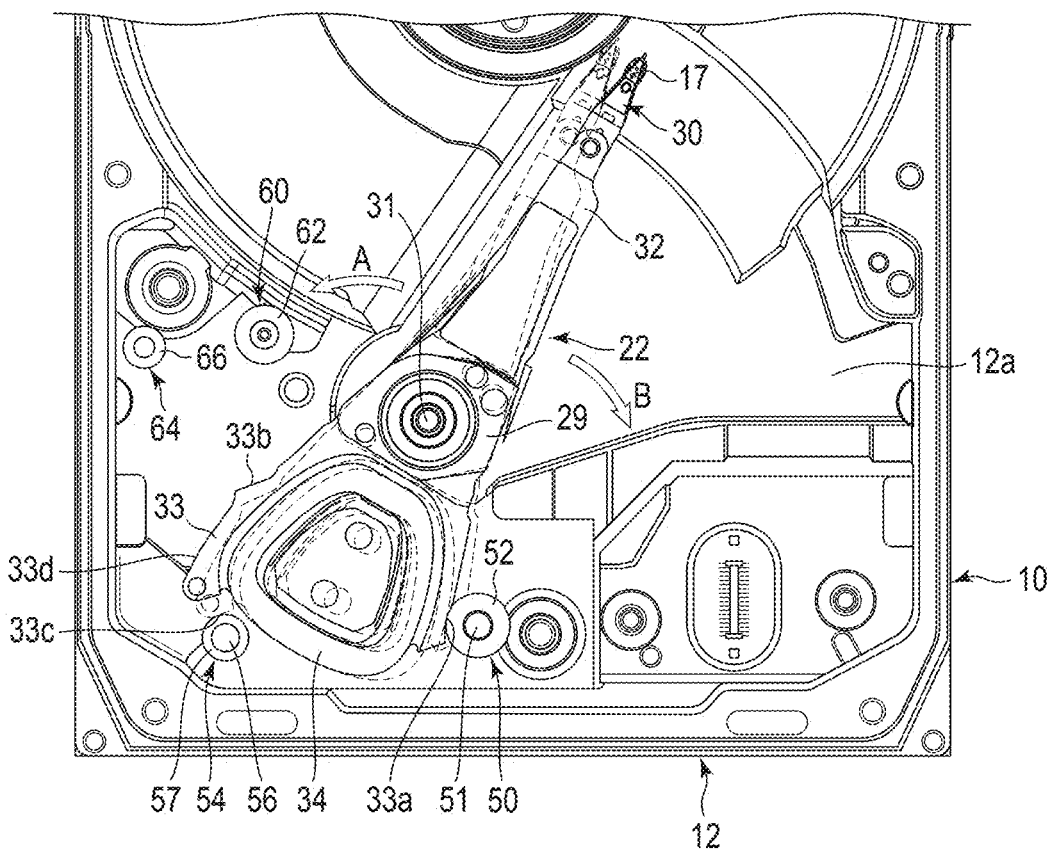
FIG. 21 is a plan view showing the actuator assembly and the housing in a state where the actuator assembly collides with an inner stopper in the HDD according to the third embodiment.

FIG. 20 is a plan view showing an actuator assembly and a housing in a state where the actuator assembly collides with an outer stopper in an HDD according to a third embodiment. FIG. 21 is a plan view showing the actuator assembly and the housing in a state where the actuator assembly collides with an inner stopper in the HDD according to the third embodiment.

As shown in the figures, in the HDD of the third embodiment, an auxiliary inner stopper 54 and an auxiliary outer stopper 64 are provided in the base 12 of the housing 10, here, on a bottom wall 12a.

As shown in FIG. 20, the auxiliary outer stopper 64 comprises a stopper pin 65 provided upright on the bottom wall 12a, and a buffer member 66 attached to the stopper pin 65. For example, the buffer member 66 is formed into a cylindrical shape. The buffer member 66 is formed of, for example, a buffer material having elasticity such as rubber or an elastomer. It should be noted that the shape of the buffer member 66 is not limited to a cylindrical shape. Various types of shapes can be applied to the shape of the buffer member 66. The material of the buffer member 66 is not limited to the same material as the buffer member 52 or 62 of the inner stopper 50 or outer stopper 60 and may be formed of a different material.

The auxiliary outer stopper 64 is provided at a position where the actuator assembly 22 comes into contact with the auxiliary outer stopper 64 when the actuator assembly 22 further moves in a second direction B after the actuator assembly 22 comes into contact with the outer stopper 60. Thus, the auxiliary outer stopper 64 restricts the move of the actuator assembly 22 in the second direction B. In this embodiment, the auxiliary outer stopper 64 is provided at a position where it is in contact with a fourth contact portion 33d located on the outer surface of the extension end of a support frame 33. In other words, the auxiliary outer stopper 64 is provided at a position where it comes into contact with the fourth contact portion 33d of the actuator assembly 22 before the outer stopper 60 is completely elastically displaced.

As shown in FIG. 21, the auxiliary outer stopper 54 comprises a stopper pin 56 provided upright on the bottom wall 12a or a lower yoke (not shown), and a buffer member 57 attached to the stopper pin 56. For example, the buffer member 57 is formed into a cylindrical shape. The buffer member 57 is formed of, for example, a buffer material having elasticity such as rubber or an elastomer. It should be noted that the shape of the buffer member 57 is not limited to a cylindrical shape. Various types of shapes can be applied to the shape of the buffer member 57. The material of the buffer member 57 is not limited to the same material as the buffer member 52 or 62 of the inner stopper 50 or outer stopper 60 and may be formed of a different material.

The auxiliary inner stopper 54 is provided at a position where the actuator assembly 22 comes into contact with the auxiliary inner stopper 54 when the actuator assembly 22 further moves in a first direction A after the actuator assembly 22 comes into contact with the inner stopper 50. Thus, the auxiliary inner stopper 54 restricts the move of the actuator assembly 22 in the first direction A. In this embodiment, the auxiliary inner stopper 54 is provided at a position where it is in contact with a third contact portion 33*c* located on the inner surface of the extension end of the support frame 33. In other words, the auxiliary inner stopper 54 is provided at a position where it comes into contact with the third contact portion 33*c* of the actuator assembly 22 before the inner stopper 50 is completely elastically displaced.

In the third embodiment, the other configurations of the HDD are the same as the HDD of the first embodiment described above. In addition, effects similar to those of the first embodiment described above can be obtained from the third embodiment. Thus, the disk device in which the amount of displacement of the actuator assembly 22 and magnetic heads 17 at the time of the collision with the stoppers can be considerably reduced can be obtained.

In the HDD of the third embodiment, both the auxiliary inner stopper 54 and the auxiliary outer stopper 64 are provided. However, the configuration is not limited to this example. Only one of the auxiliary inner stopper 54 and the auxiliary outer stopper 64 may be provided. Even in this case, the amount of displacement at the time of the collision of the actuator assembly on the inner side or the outer side can be reduced, thereby reducing the margin setting amount.

Further, the third embodiment and the first embodiment may be combined with each other. Specifically, one of the auxiliary inner stopper 54 and the auxiliary outer stopper 64 may be provided on the base 12 side, and the other one may be provided in the top cover 14.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the various embodiments described above, the shape of each buffer member is not limited to a cylindrical shape. Various types of shapes can be selected for the shape of each buffer member. Each buffer member should at least comprise a contact portion which comes into contact with the actuator assembly. The absorption material or absorption unit may not be provided in both the inner stopper and the outer stopper and may be provided in only one of the stoppers. Even in this case, the effect of reducing the amount of diffusion of outgassed components can be obtained.

What is claimed is:

1. A disk device comprising:
a disk-shaped recording medium;
an actuator assembly which is pivotably provided;
a magnetic head supported in the actuator assembly;
a first stopper which is provided contactably with the actuator assembly and defines a move of the actuator assembly in a first direction; and
a first auxiliary stopper which is provided at a position where the actuator assembly comes into contact with the first auxiliary stopper after the actuator assembly comes into contact with the first stopper, and which defines the move of the actuator assembly in the first direction.

2. The disk device of claim 1, wherein
the first stopper comprises an elastic buffer member which is provided contactably with the actuator assembly, and the first auxiliary stopper is provided at a position where the first auxiliary stopper comes into contact with the actuator assembly before the buffer member completely elastically deforms in the first direction.

3. The disk device of claim 1, further comprising
a housing comprising:
a base in which the recording medium and the actuator assembly are provided; and
a cover with which an opening of the base is closed, wherein
the first stopper is provided in the base, and the first auxiliary stopper is provided on the cover.

4. The disk device of claim 3, wherein
the housing comprises a gasket held between the base and the cover, and
the first auxiliary stopper is formed of a material of the gasket, and is provided on an inner surface of the cover.

5. The disk device of claim 3, wherein
the actuator assembly includes an actuator block pivotably supported in the base, an arm and a suspension extending from the actuator block to a recording medium side, the magnetic head supported at an extension end of the suspension, and a support frame extending from the actuator block in a direction opposite to the arm,
the first stopper is provided at a position where the first stopper is contactable with the support frame, and
the first auxiliary stopper is provided at a position where the first auxiliary stopper is contactable with the arm.

6. The disk device of claim 3, wherein
the actuator assembly includes an actuator block having a contact surface and pivotably supported in the base, an arm and a suspension extending from the actuator block to a recording medium side, the magnetic head supported at an extension end of the suspension, and a support frame extending from the actuator block in a direction opposite to the arm,
the first stopper is provided at a position where the first stopper is contactable with the support frame, and
the first auxiliary stopper is provided at a position where the first auxiliary stopper is contactable with the contact surface of the actuator block.

7. The disk device of claim 1, further comprising
a housing comprising:
a base in which the recording medium and the actuator assembly are provided; and
a cover with which an opening of the base is closed, wherein
the first stopper is provided in the base, and the first auxiliary stopper is provided in the base.

8. The disk device of claim 1, further comprising:
a second stopper which is provided contactably with the actuator assembly and defines a move of the actuator assembly in a second direction opposite to the first direction; and
a second auxiliary stopper which is provided at a position where the actuator assembly comes into contact with the second auxiliary stopper after the actuator assembly comes into contact with the second stopper, and which defines the move of the actuator assembly in the second direction.

9. The disk device of claim 8, wherein
the second stopper comprises an elastic buffer member which is provided contactably with the actuator assembly, and
the second auxiliary stopper is provided at a position where the second auxiliary stopper comes into contact with the actuator assembly before the buffer member of the second stopper completely elastically deforms in the second direction.

10. The disk device of claim 8, further comprising a housing comprising:

a base in which the recording medium and the actuator assembly are provided; and a cover with which an opening of the base is closed, wherein the second stopper is provided in the base, and the second auxiliary stopper is provided on the cover.

11. The disk device of claim 10, wherein the actuator assembly includes an actuator block pivotably supported in the base, an arm and a suspension extending from the actuator block to a recording medium side, the magnetic head supported at an extension end of the suspension, and a support frame extending from the actuator block in a direction opposite to the arm, the second stopper is provided at a position where the second stopper is contactable with the support frame, and the second auxiliary stopper is provided at a position where the second auxiliary stopper is contactable with the arm.

12. The disk device of claim 8, further comprising a housing comprising:

a base in which the recording medium and the actuator assembly are provided, and a cover with which an opening of the base is closed, wherein the second stopper is provided in the base, and the second auxiliary stopper is provided in the base.

13. The disk device of claim 1, wherein the first stopper comprises a stopper pin and an elastic buffer member which is attached to the stopper pin and provided contactably with the actuator assembly.

14. A disk device comprising:

a disk-shaped recording medium;

an actuator assembly which is pivotably provided;

a magnetic head supported in the actuator assembly;

a first stopper which is provided contactably with the actuator assembly and defines a move of the actuator assembly in a first direction; and a first auxiliary stopper which is separated from the first stopper and provided at a position where the actuator assembly comes into contact with the first auxiliary stopper after the actuator assembly comes into contact with the first stopper, and which defines the move of the actuator assembly in the first direction.

* * * * *